(12) United States Patent
Ingenito et al.

(10) Patent No.: US 9,354,438 B2
(45) Date of Patent: *May 31, 2016

(54) ADJUSTMENT TURRET

(71) Applicant: Swarovski-Optik KG., Absam (AT)

(72) Inventors: Mario Ingenito, Gallzein (AT); Sandra Wechselberger, Weer (AT)

(73) Assignee: Swarovski-Optik KG. (AT)

( * ) Notice: Subject to any disclaimer, the term of this patent is extended or adjusted under 35 U.S.C. 154(b) by 0 days.

This patent is subject to a terminal disclaimer.

(21) Appl. No.: 14/470,456

(22) Filed: Aug. 27, 2014

(65) Prior Publication Data

US 2015/0146289 A1    May 28, 2015

(30) Foreign Application Priority Data

Sep. 11, 2013    (AT) ............................... A 50567/2013

(51) Int. Cl.
| | | |
|---|---|---|
| *G02B 23/16* | (2006.01) | |
| *G02B 7/02* | (2006.01) | |
| *F41G 1/38* | (2006.01) | |

(52) U.S. Cl.
CPC   *G02B 23/16* (2013.01); *F41G 1/38* (2013.01); *G02B 7/023* (2013.01); *G02B 7/026* (2013.01)

(58) Field of Classification Search
CPC ........ G02B 23/16; G02B 7/023; G02B 7/026; F41G 1/38
USPC ..................... 359/399, 429; 42/119, 120, 122
See application file for complete search history.

(56) References Cited

U.S. PATENT DOCUMENTS

| | | | | |
|---|---|---|---|---|
| 3,037,287 | A | | 6/1962 | Glatz et al. |
| 4,294,541 | A | * | 10/1981 | Abler ............................ 356/145 |
| 5,103,248 | A | * | 4/1992 | Sato .............................. 359/414 |
| 6,691,447 | B1 | * | 2/2004 | Otteman ......................... 42/122 |
| 7,612,952 | B2 | * | 11/2009 | Schafer ......................... 359/813 |
| 8,166,696 | B2 | * | 5/2012 | Hamilton ........................ 42/122 |
| 8,875,435 | B2 | * | 11/2014 | Menges et al. .................. 42/122 |
| 8,919,026 | B2 | * | 12/2014 | Hamilton ........................ 42/119 |
| 2004/0144013 | A1 | | 7/2004 | Leatherwood |
| 2009/0199451 | A1 | * | 8/2009 | Zaderey et al. ................. 42/122 |
| 2011/0199677 | A1 | * | 8/2011 | Schick et al. ................. 359/428 |
| 2013/0232846 | A1 | * | 9/2013 | Wagner et al. .................. 42/119 |

(Continued)

FOREIGN PATENT DOCUMENTS

| | | |
|---|---|---|
| CN | 201548148 U | 8/2010 |
| CN | 201780052 U | 3/2011 |
| DE | 20301749 U1 | 4/2003 |

(Continued)

*Primary Examiner* — Frank Font
(74) *Attorney, Agent, or Firm* — Lerner, David, Littenberg, Krumholz & Mentlik, LLP

(57) ABSTRACT

The invention relates to an adjustment turret comprising a base, a rotary control element, which can be rotated relative to the base about an axis of rotation, a display element, which can be rotated about the axis of rotation, and a mechanical coupling mechanism coupling the rotary control element together with the display element, the mechanical coupling mechanism being configured such that the display element can be rotated about the axis of rotation by the rotary control element into at least one rotational position of the rotary control element, wherein the coupling mechanism is configured such that during a full rotation of the rotary control element about the axis of rotation the display element can be rotated by the rotary control element relative to the base only about an angle of rotation which corresponds to part of a full rotation.

26 Claims, 9 Drawing Sheets

(56) References Cited

U.S. PATENT DOCUMENTS

Figure 1:
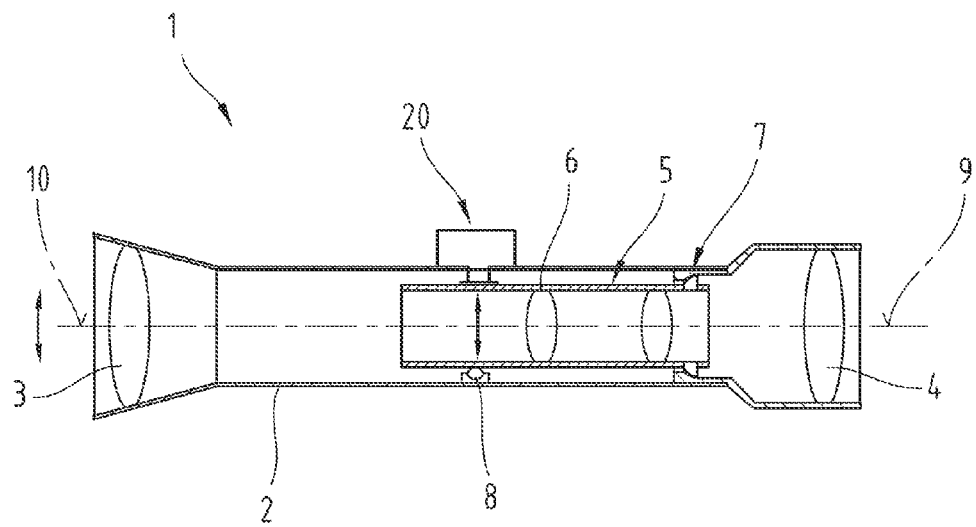

2014/0002815 A1 1/2014 Jaeschke et al.
2015/0070758 A1* 3/2015 Ingenito ................ 359/399

FOREIGN PATENT DOCUMENTS

| | | |
|---|---|---|
| DE | 102011013456 A1 | 9/2012 |
| WO | 2012119574 A1 | 9/2012 |

* cited by examiner

ADJUSTMENT TURRET

The invention relates to an adjustment turret for a long-range optical device, in particular a telescopic sight, according to the preamble of claim 1, and to a long-range optical device.

DE20301749U1 discloses an adjusting device for a telescopic sight comprising a display cylinder mounted between a cover and an adjusting cap which has a dual-colored marking around its circumference and is arranged behind viewing windows. The display cylinder always rotates with the adjusting cap. The display cylinder is also rotated relative to the adjusting cap in only one rotational position of the adjusting cap. The relative rotation of the display cylinder is performed by means of a control pin which is attached eccentrically onto a pendulum cylinder. The pendulum cylinder is mounted rotatably in an eccentric bush of the adjusting cap and connected in movement with an adjusting bolt engaging from below. The adjusting bolt thus functions as a driver. The adjusting cap can perform two or more complete rotations. The adjusting cap has two different scales around its circumference. The colors of the display cylinder visible through the viewing windows indicate which scale is to be read on the adjusting cap at a given moment. The scales are formed in this case by different colored engraved markings.

The disadvantage of such a solution is that the number of rotations at which the height adjustment can still be displayed effectively is very restricted. As there are only two different colored markings on the display cylinder it is only possible to show two rotations as such. Furthermore, the required color allocation is not user-friendly and can result in reading errors. The viewing windows are complex in terms of their structure and susceptible to getting dirty.

DE102011013456A1 discloses an adjusting device with a rotating ring in which two complete rotations are possible and can be detected by touch. In addition the adjusting device comprises a guide pin and a lower and upper guiding groove. After a complete rotation the guide pin changes by axial displacement of the rotating ring from the bottom to the top groove. The upwards movement of the rotating ring makes it possible to feel by touch the current rotational position of the rotating ring. However, this kind of detection by touch is not always reliable. Furthermore, an adjusting device of this kind is restricted to two complete rotations. The provision of a plurality of guiding groves arranged above one another would lead to a disproportionally large axial displacement of the rotating ring, whereby the required mechanical stability of the adjusting device would no longer be ensured.

U.S. Pat. No. 6,691,447B1 discloses a telescopic sight with an adjustment turret, which comprises a rotary cap for rotational activation by a user. The rotary cap is provided with a scale around its circumference. Underneath the rotary cap a further non-rotational scale is provided, the markings of which extend in the axial direction of the adjustment turret and provide information about the number of rotations of the rotary cap. The principle is similar to that of a micrometer. The disadvantage of such a solution is that the user can only read the current rotational position with difficulty, particularly if the incline of the spindle is low, (the marking lines do not differ from one another very much in terms of height) and in the dark. Furthermore, the scale cannot be reset to "0", as it is stationary in relation to the telescopic sight.

WO2012119574A1 discloses an adjusting device for adjusting the reticle device of a telescopic sight. In this case an index ring that is rotatable together with the adjusting cap and a plurality of scale values are provided on a stationary second index ring. After a complete rotation the scale values of the second index ring are released by axial displacement of the first index ring and are thus visible to the user. In this way information is provided about the respective rotational position of the adjusting cap (also over a complete rotation). It is a disadvantage however that the rotational range of the adjusting cap is limited to two rotations.

The disadvantages of the prior art are in particular that in adjustment turrets with a rotary display the total number of rotations of the rotary operating element is severely limited (to two or three full rotations) because of the mechanical structure used. Furthermore, by means of a complicated and partly asymmetrical or eccentric construction the shot resistance is considerably reduced. The need to use very small components in such a structure means that it is highly susceptible to failure.

The aim of the present invention is to overcome the disadvantages of known systems and provide an adjustment turret which enables a plurality of rotations of the rotary control element and at the same time comprises a display which provides information about the rotational position of the adjustment turret. The display should be easy to read for the user without errors being made. It should be possible to read the display from a direction perpendicular to the axis of the adjustment turret. The mechanical structure should be simple and highly shot resistant. Precise settings should be made possible. In one embodiment the rotation display should be adjustable and calibrated relative to the base, e.g. in order to determine the "0" position, which corresponds to the zeroing distance.

Said aim is achieved by an adjustment turret of the aforementioned kind in that the coupling mechanism is configured such that during a full rotation of the rotary control element about the axis of rotation the display element can be rotated relative to the base by the rotary control element about an angle of rotation that only corresponds to part of a full rotation.

Whilst the rotary control element is rotated about the axis of rotation relative to the base by a full rotation (i.e. 360°), the display element is rotated or clicked further relative to the base by only a fraction of a full rotation. The coupling mechanism is thus a reduction gear between the rotary control element and display element. The transmission ratio (speed of the rotary control element relative to the base/speed of the drive element relative to the base) is therefore greater than 1. The rotary control element is used for adjusting the line of sight and acts on an actuating element (usually a threaded spindle, by means of which the rotational movement is converted into a linear adjusting movement).

In particular it is noted that the invention comprises both
coupling mechanisms, in which within a full rotation there is a continual transmission of the rotational movement from the rotary control element to the display element (the display element always rotates therewith, but at a slower speed of rotation than the rotary control element), and
coupling mechanisms, in which the transmission of the rotational movement from the rotary control element to the display element is performed intermittently and thus the rotational movement of the display element is performed incrementally or abruptly (the display element during a rotary phase of the rotary control element is disconnected from the latter or rests in relation to the base and during another rotary phase of the rotary control element is coupled with the latter and is rotated together with the rotary control element—preferably at the same rotational speed—relative to the base).

In the first case the coupling mechanism is a gear with continuous transmission and in the second case a gear with intermittent transmission.

The main advantage of the invention is that the display element is moved further relative to the base by only a fraction of a full rotation when the rotary control element performs a full rotation. By means of a scale applied to the display element and a reference scale, which is stationary relative to the base, the current rotation number of the rotary control element can be read in a simple and user-friendly manner.

In contrast, in the adjustment turret of DE20301749U1 the dual-colored display cylinder always rotates with the adjusting cap. A plurality of viewing windows are required around the circumference in order to see the changing positions of the adjusting cap from one direction.

In a preferred embodiment all of the rotatable components (in the installed state) of the coupling mechanism are mounted rotatably about the axis of rotation about which the rotary control element can also be rotated. This enables the use of larger components, simplifies the construction and increases the shot resistance.

Preferably, the coupling mechanism is designed such that the angle of rotation about which the display element can be rotated around the axis of rotation during a full rotation of the rotary control element is at most 72°, preferably at most 54°. In other words the transmission ratio between the rotary control element and display element (as viewed relative to the base) is greater than 5, preferably greater than 6.67. In a particularly preferred configuration the transmission ratio could be at least 10, so that it would be possible to display at least 10 full rotations of the rotary control element. Embodiments have proved to be particularly preferable in which the transmission ratio is about 20.

Preferably, by means of the rotary control element more than two, preferably at least four, particularly preferably at least nine full rotations can be performed about the axis of rotation. This enables a particularly fine adjustment of the line of sight by adjusting an optical component of a telescopic sight (e.g. reversing system or lens).

Preferably, the display element is provided with a scale which has markings of the same kind spaced apart around the circumference of the display element, wherein the angular spacing between adjacent markings of the same kind corresponds to the rotary angle about which the display element can be rotated during a full rotation of the rotary control element about the axis of rotation. According to this embodiment the angular distance between the markings reflects the transmission ratio of the coupling mechanism. The term "markings of the same kind" refers to the fact that the markings are considered to be related and belong to a graduated scale. In addition a subordinate scale can be provided with a smaller scale graduation. The markings of the same kind can be e.g. lines of the same length, digits of the same size etc. The scale on the display element can be configured in various different ways. Thus it can be a purely numerical scale or a scale consisting of geometric or colored markings, such as lines, points, shapes and the like, or a combination thereof.

Preferably, the markings of the same kind form a numerical sequence. This enables the user to immediately identify the current rotational position of the rotary control element.

Preferably, the rotary control element is provided with a scale which comprises markings spaced apart from one another around the circumference of the rotary control element. In this way the position of the rotary control element can also be displayed to the user within a rotation.

Preferably, the rotary control element is arranged above the display element. The display element is thus located in the installed position of the adjustment turret more closely in the long-range optical device than the rotary control element. Owing to the optimal accessibility of the rotary control element from above this enables the easy handling of the adjustment turret.

A preferred embodiment of the invention relates to a so-called "multi-turn" turret display, in which a scale is provided as an essential feature for the number of completed rotations of the turret. The latter is preferably arranged immediately below the scale of "clicks" (scale on the rotary control element). The reading areas for both scales are directly above one another and thus arranged in the field of vision of the user along the optical axis of the long-range optical device.

For each rotation e.g. the adjustment range of the rotary control element (clicks) could be 20 MOA (minutes of angle). By means of the minutes of angle the deviation from the reference setting is indicated which has been determined or set for a specific shot requirement (e.g. 100 m). The connection between the linear adjusting path of the actuating element and the tilting angle of the line of sight is dependent on the actual mechanical structure, so that these considerations are only given by way of illustration or example. The adjusting movements enable a high degree of precision, e.g. in the region of 2 µm, of the turret height adjusting movement, which acts on the reversing system. The height adjustment could be e.g. a total of 4.4 mm, i.e. +/−2.2 mm. In total e.g. in an embodiment with up to seven rotations there are thus 140 MOA, i.e. +/−70 MOA for all rotations. The advantage is that said rotations can also be counted.

The rotary control element, which can be attached, e.g. in the manner of a cap, by a grub screw onto the turret, can be "customized", i.e. designed according to the customer's requirements and/or provided with a desired scale (e.g. engraved). A further advantage of the embodiment is that the whole scale of possible rotations can be read on the ring or sleeve-like display element and in this way there is increased transparency for the user.

Preferably, the rotary control element and the display element overlap at least partly, wherein preferably in the overlapping area between the rotary control element and display element there is a sealing ring. In this way the penetration of dirt and moisture is prevented.

Preferably, the section of the display element, which is provided with the scale, forms a casing section of the adjustment turret. This ensures not only a compact structure, but in the installed state of the adjustment turret makes it possible to read the markings easily from the direction of the eyepiece of a long-range optical device.

Preferably, the rotary control element and the display element are arranged above one another in the direction of the axis of rotation. This makes it possible to read a marking or scale on the display element at the same time and a marking or scale on the rotary control element, from a direction perpendicular to the axis of the adjustment turret. In this way two pieces of information can be acquired at a glance. Preferably, the coupling mechanism is designed so that the transmission of the rotational movement from the rotary control element to the display element is performed intermittently. The transition from one full rotation to the next can in this way be displayed more clearly and accurately for the user.

Preferably, the coupling mechanism can be moved between a coupled position, in which the display element can be rotated by the rotary control element and an uncoupled position, in which the display element is disconnected from the rotational movement of the rotary control element. The rotational movement of the rotary control element is transmitted here intermittently to the display element. The latter is clocked further after each full rotation of the rotary control element. This embodiment is particularly advantageous, as the display element during a large part of the rotational movement of the rotary control element is at rest relative to the base and is uncoupled from the rotary control element. This makes it possible not only to have a mechanically simple structure but also ensures a high degree of shot resistance. In the position of rest e.g. the display element can be locked in relation to the base. There is thus a sharp transition between the individual rotation counting positions, i.e. the display element is not moved further continually as in a clock mechanism until the next digit is reached according to the next rotation, but there is in fact an abrupt transition to the next digit.

Preferably, the coupling mechanism comprises a driver, which in relation to the axis of rotation is axially displaceable between a first position and a second position, wherein in the first position, which corresponds to the uncoupled position of the coupling mechanism, the driver is disconnected from the rotary control element and in the second position, which corresponds to the coupled position of the coupling mechanism, the driver is connected to the rotary control element and can be rotated by the rotary control element about the axis of rotation, so that a rotational movement of the rotary control element can be transmitted via the driver to the display element.

This embodiment makes it possible to achieve the coupling by the axial displacement of a driver, whereby the use of small components with their own axis of rotation can be avoided. Further axes of rotation, apart from the axis of rotation about which the rotary control element rotates, are not necessary. In this way the construction is simplified which can be largely concentric to the axis of rotation of the rotary control element.

Preferably, the driver comprises at least one driver structure projecting in radial direction, which projects into at least one recess of the display element formed around the periphery of the display element. This makes it possible to achieve a space-saving structure. The recess can be formed or provided on the display element, e.g. so that it is covered by the rotary control element. The recess is preferably so long in axial direction (or open towards the top), to enable the axial displacement of the driver, without the coupling to the display element being lost. Preferably, the driver comprises at least one driver pin, which in the coupled position engages in a drive element connected to the rotary control element. This ensures a reliable connection. The latter is a form-fitting coupling, whereby the disadvantages of a frictionally connected coupling (slip) are avoided.

Preferably, the drive element comprises a perforated disk. The driver pin drives at least partly into the hole that is flush therewith, whereby a reliable connection is obtained. Depending on the transmission ratio of the coupling mechanism the holes in the perforated disk can be distributed accordingly.

Preferably, the driver comprises a spring, which loads the driver pin in the coupled position in the direction of the drive element. This ensures a reliable connection and at the same time performs the function of tolerance compensation in the case of inexactly aligned holes.

Preferably, the driver is guided in a guide which is positioned essentially parallel to the axis of rotation. This results as far as possible in the precise positioning of the driver pin e.g. underneath a hole of the perforated disk.

Preferably, the coupling mechanism comprises a switching mechanism, which in a rotational position of the rotary control element moves the driver from the first position into the second position. An additional switching mechanism further increases the comfort of activating the adjustment turret and ensures a gentle, hardly noticeable transition between the coupled position and uncoupled position and vice versa.

Preferably, the switching mechanism comprises a switching element, which is mounted to be axially displaceable relative to the axis of rotation and can be rotated by the rotary control element about the axis of rotation, and an actuating element which is stationary in relation to the base and in a rotational position of the rotary control element pushes the switching element axially in the direction of the driver. In particular, this is a slide control or slide guide, which can be designed in the form of a sliding track or forced driven guide. The actuating element provides a kind of barrier in the rotational path of the switching element. The switching element is pushed in axial direction (upwards) on overcoming the barrier in axial direction, whereby it then acts on the driver. By means of the switching mechanism or switching element in cooperation with the actuating element the process of axially displacing the driver is largely disconnected from the transmission of the rotational movement of the rotary control element to the display ring.

Preferably, the switching element comprises on one of its end faces a peripheral groove, which is interrupted at one point by a web, wherein the actuating element is guided in the uncoupled position in the groove and in the coupled position bears against the web and thus displaces the switching element in axial direction. This provides a particularly compact and secure switching mechanism. The actuating element can in this case be a pin or bolt, which is rounded at its end facing the groove.

Preferably, the coupling mechanism comprises a spring, which loads the driver in the direction of the first position. In this way it is ensured that the display element is not driven by the rotary control element, if a connection is not made because of the intermittent transmission mechanism.

Preferably, the coupling mechanism comprises a spring, which loads the switching element in the direction of the uncoupled position. In this way it is ensured that there are no "switching errors".

Preferably, the driver and the switching element are each loaded respectively by a separate spring in the direction of the disconnected position, thereby increasing the reliability further.

Preferably, the spring is a spiral spring which is arranged to be concentric to the axis of rotation. This enables the installation of relatively large springs, simplifies the installation and increases shot resistance.

In a preferred embodiment, the movement of the rotary control element (rotation) is transmitted via a rotary transmission spindle to an actuating element on the bottom side of the adjustment turret (translational movement) and the driver and the switching element surround the rotary transmission spindle.

Preferably, the coupling mechanism comprises a locking device, which in the uncoupled position locks the display element to the base in a rotationally secure manner. In this way it is ensured that the display element does not begin to rotate by itself (i.e. independently of the rotary control element), e.g. because of external influences such as vibrations, recoil during a shot, etc., and does not provide a false rotation display.

Preferably, a first part of the locking device is formed by the driver and a second part of the locking device, which works together with the first part of the locking device, is designed to be stationary in relation to the base, wherein preferably the first part of the locking device comprises locking elements distributed around the circumference of the driver and the second part of the locking device comprises locking elements designed to be stationary in relation to the base.

Here the driver not only performs the task of transmitting the rotational movement but also of locking the display element. The concentration of these functions in one component (driver) reduces the total number of components and simplifies the construction. Preferably, the driver comprises a plurality of locking elements around its circumference.

Preferably, the driver is designed to be annular and is arranged concentrically around the rotary control element. In this way a space-saving and stabile construction is obtained.

Preferably, the locking elements (of the second part of the locking device), which are designed to be stationary in relation to the base, are formed on a locking sleeve which is stationary in relation to the base.

Preferably, the adjustment turret comprises a device for converting the rotational movement of the rotary control element into a translational movement of an actuating element, wherein preferably the device comprises a threaded spindle. The actuating element acts in the installed position of the adjustment turret on an optical element or the graticule of the long-range optical device. Usually, the actuating element can be moved along the axis of rotation of the rotary control element.

Preferably, the adjustment turret comprises a reference marking, which is stationary in relation to the base and provides a reference to at least one marking on the display element, wherein preferably the reference marking is a viewing window, through which the at least one marking of the display element is visible. The stationary reference marking in connection with the marking or scale on the display element enables the user-friendly and error-free reading of the current rotational position of the rotary control element.

The disadvantages of the prior art relating to adjusting the line of sight to the zeroing distance (corresponds to the individual basic setting of a specific weapon, e.g. 100 m) are that either it is not possible to fall short of the desired distance (e.g. less than 100 m) by means of the adjustment turret and a partial removal and resetting of the adjustment turret is necessary, or the corresponding basic setting cannot be reproduced by the user or cannot be identified or felt during the adjustment.

The aim of one embodiment of the present invention is to overcome the disadvantages of previously known systems and provide an adjustment turret in which a stop position, which delimits the rotational movement of the rotary control, can be overcome. In addition, the intention is to apply a mechanically simple and user-friendly solution. The release of the stop position should preferably be performed independently of the rotary control element, which is used for adjusting the line of sight.

Said aim is achieved by means of an adjustment turret for a long-range optical device, in particular telescopic sight, comprising a base, a rotary control element that is rotatable relative to the base about an axis of rotation, a stop pair consisting of a first stop and a second stop, which in the stop position delimit the rotational movement of the rotary control element, and a mechanism for overcoming the stop position of the stop pair, in that the mechanism comprises an actuating element that is accessible from the outside, which bears one of the stops or works together with one of the stops and in at least one rotary position of the rotary control element can be moved relative to the base and relative to the rotary control element, so that by activating the actuating element one stop can be moved relative to the other stop, whereby the stop position can be overcome.

The actuating element can be identical to the display element already described above.

This construction ensures that the stop position can be released independently of the rotary control element. The rotary control element is used for adjusting the line of sight and also acts on an actuating element (usually a threaded spindle, by means of which the rotational movement is converted into a linear adjusting movement). There is thus a transition from the stop position to a release position by activating an additional actuating element, which can be moved relative to the rotary control element. It is thus not necessary to lift the rotary control element in order to release the stop position, as is the case with the adjustment turret from DE102011013456A1. The relative movement of the stops, to move from the stop position to a release position, is disconnected from the movement of the rotary control element.

By means of this embodiment it is possible to ensure an override for setting in particular a smaller distance from the reference distance (e.g. 100 m), the setting of which is defined by the stop position, without needing to change the actual stop position around the circumference by adjustment means (by unscrewing the adjustment turret, adjusting the stop and then assembling the adjustment turret).

The rotational movement of the rotary control element is thus only limited temporarily: the activation of the actuating element by the user causes a relative displacement of the stops and thereby a release of the stop position. The rotary control element can then be rotated further.

Preferably, the actuating element can be displaced axially in the at least one rotational position of the rotary control element relative to the axis of rotation. This ensures simple handling. Furthermore, the movement of the axial displacement for the user can be easily distinguished from the rotational movement of the rotary control element.

Preferably, the first stop is stationary in relation to the base and the actuating element bears the second stop. In this embodiment the activation of the activating causes directly causes a movement of the second stop. The underlying mechanism can thus be much simplified and is characterized by being extremely reliable.

Preferably, the actuating element can be rotated about the axis of rotation and the adjustment turret comprises a mechanical coupling mechanism, by means of which the rotary control element works together with the actuating element, wherein the coupling mechanism is configured so that the actuating element in at least one rotational position of the rotary control element can be rotated by the rotary control element about the axis of rotation. In this way a particularly reliable connection is created between the rotary control element and one of the stops. The rotation of the rotary control element is transmitted (continually or intermittently) to the actuating element. The actuating element transmits the rotational movement in turn to the (second) stop, so that the stop position is reached at some point (second stop hits the first stop). Firstly, this prevents the actuating element from rotating further, whereby by relaying the coupling mechanism the rotary control element is also blocked in its rotation. Only when the actuating element is activated accordingly, e.g. by axial displacement, is the stop position overcome, so that the rotary control element can then also be rotated further.

Preferably, the rotary control element and the actuating element are arranged above one another in the direction of the axis of rotation. This improves its handling for the user, as the corresponding actuating element can be clearly distinguished from the rotary control element.

Preferably, the coupling mechanism is configured so that during a full rotation of the rotary control element about the axis of rotation the actuating element can be rotated relative to the base by the rotary control element only about a rotational angle which corresponds to part of a full rotation. In this way the rotational movement of the actuating element is limited in relation to the rotational movement of the rotary control element, whereby the actuating element can also perform the function of a display element, as described in more detail below.

Preferably, the actuating element is a display element (or identical or in one piece with the display element described above), which is rotatable about the axis of rotation and along its circumference has at least one externally visible marking. The display element can be used to display to the user the number of rotations of the rotary control element.

Preferably, the actuating element can only be activated in the rotational position of the rotary control element which corresponds to the stop position of the stop pair. In this way an incorrect or unintentional operation of the device is prevented, which could lead to the wear or damage of components or the penetration of dirt.

Preferably, the first stop is connected detachably to the base and can be secured along the circumference in different positions relative to the base. This enables the individual adjustment of the stop position to the adjustment path of the actuator element (e.g. threaded spindle) which corresponds to the zeroing distance. The latter is thus a stop that can be adjusted individually to the zeroing distance. In addition, the upper part of the adjustment turret is removed and the first stop, which sits e.g. in a sleeve, is repositioned relative to the base and secured. For example, the stop can sit in a sleeve and the sleeve is rotated together with the stop in order to reach the desired position.

After the adjustment turret has been reassembled said stop pair forms a so-called soft-zero-stop. The user has the option—as already described above—by moving, e.g. lifting the actuating element to pass through said soft-zero-stop in both directions, without the position marking having to be abandoned.

Preferably, the first stop sits in a sleeve. This facilitates the adjustment of the first stop relative to the base.

Preferably, the first stop is a projection protruding radially outwards in relation to the axis of rotation, in particular a pin or bolt. This represents a space-saving and reliable solution.

Preferably, the mechanism for overcoming the stop position comprises a stop ring, which forms the second stop and a peripheral guide, in which the first stop is guided prior to reaching or after overcoming the stop position. This facilitates the transition and the activation and enables the user to see from the position of the actuating element whether it is positioned above or below the stop position.

Preferably, the actuating element is configured to be sleeve-like and the stop ring is inserted into the actuating element and secured, in particular adhered. This is a space-saving and easily manufactured solution.

In a preferred embodiment the adjustment turret comprises a device for converting the rotational movement of the rotary control element into a translational movement of an actuating element, wherein the device comprises a rotary transmission spindle which is connected to the rotary control element, a transmission element which is connected in a rotationally secure manner to the rotary transmission spindle and on its side facing the actuating element has at least two arms and on its outside in the region of the arms has an obliquely or conically formed section, whereby the obliquely or conically formed section of the transmission element in the installed state is pushed against a counter face of the rotary transmission spindle, so that on the basis of the force acting on the oblique or conically formed section the arms are pushed towards one another and the actuating element or an element arranged in front of the actuating element is wedged between them. The actuating element or the element arranged in front of the actuating element is a threaded spindle, which is mounted in an internal thread of the base.

In this way a lost motion, which could be caused by manufacturing or installation tolerances, can be prevented efficiently. The wedging force of the arms acting on the actuating element or an element mounted in front in the drive chain prevents any play, so that there is no lost motion even when changing the direction of rotation. The arms still allow the actuating element (in the form of a threaded spindle) to move in axial direction translationally relative to the transmission element so that a linear adjusting path can be formed. In addition e.g. the facing surfaces of the arms can be essentially parallel to one another. The counter face der rotary transmission spindle is also preferably designed to be conical.

Preferably, the transmission element has a toothing on its outside which sits in an internal toothing of the rotary transmission spindle. In this way the rotationally secure connection between the transmission element and rotary transmission spindle is increased further.

Preferably, at least one screw connects the transmission element to the rotary transmission spindle and pushes in a direction along the conical axis of the conical section against the counter face of the rotary transmission spindle. The use of a screw to achieve the wedging force is a particularly reliable and simple solution.

Preferably, the transmission element on the side facing away from the arms has an axial hole, preferably with an internal thread, and radially outwardly leading openings connect the inside of the hole with the outside of the transmission element. Adhesive can be inserted through the radial openings in a simple way, which flows in the direction of the outside of the transmission elements and thus creates a reliable connection between the transmission element and rotary transmission spindle.

Preferably, the transmission element is made of plastic. This ensures the necessary flexibility of the arms to achieve the wedging effect Preferably, the transmission element is adhered to the rotary transmission spindle by means of adhesive.

The aim is also achieved by means of a long-range optical device, in particular a telescopic sight, with an adjustment turret, in particular for adjusting the line of sight by adjusting at least one optical component inside the long-range optical device, wherein the adjustment turret is configured according to one of the preceding embodiments.

For a better understanding of the invention the latter is explained in more detail with reference to the following Figures.

Figure 2:
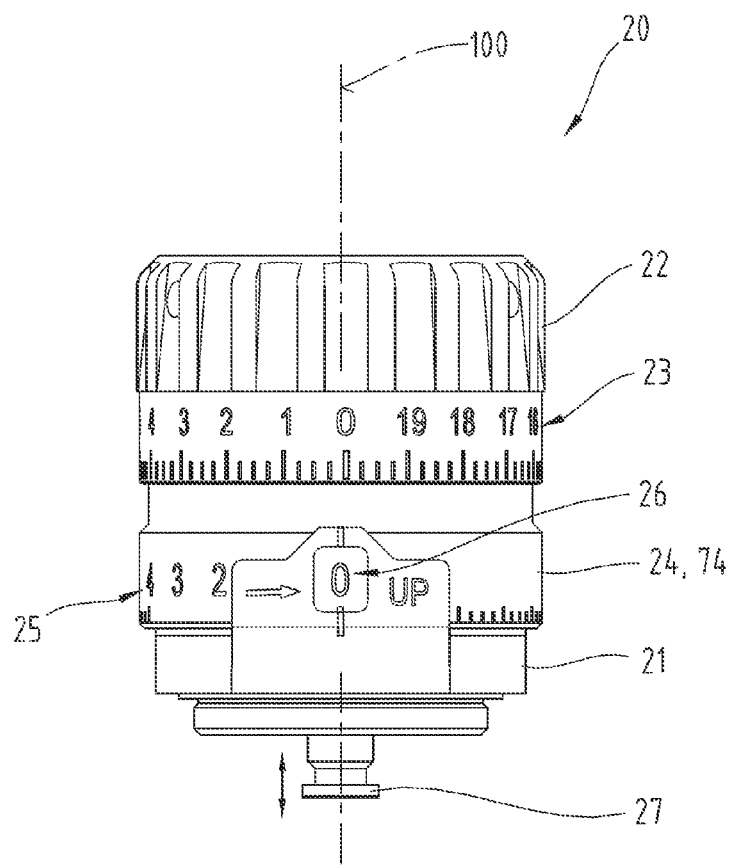
Figure 3:
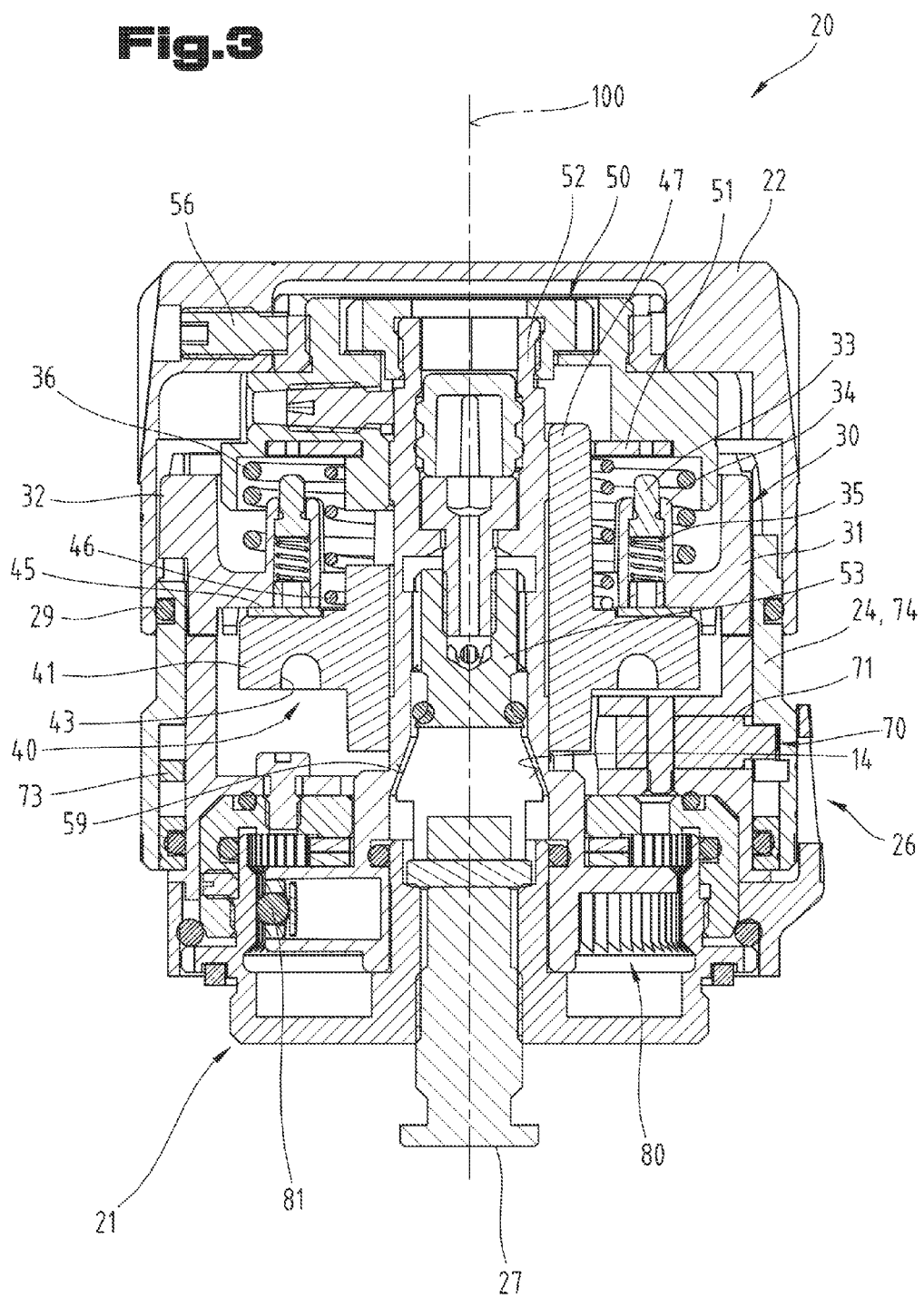
Figure 4:
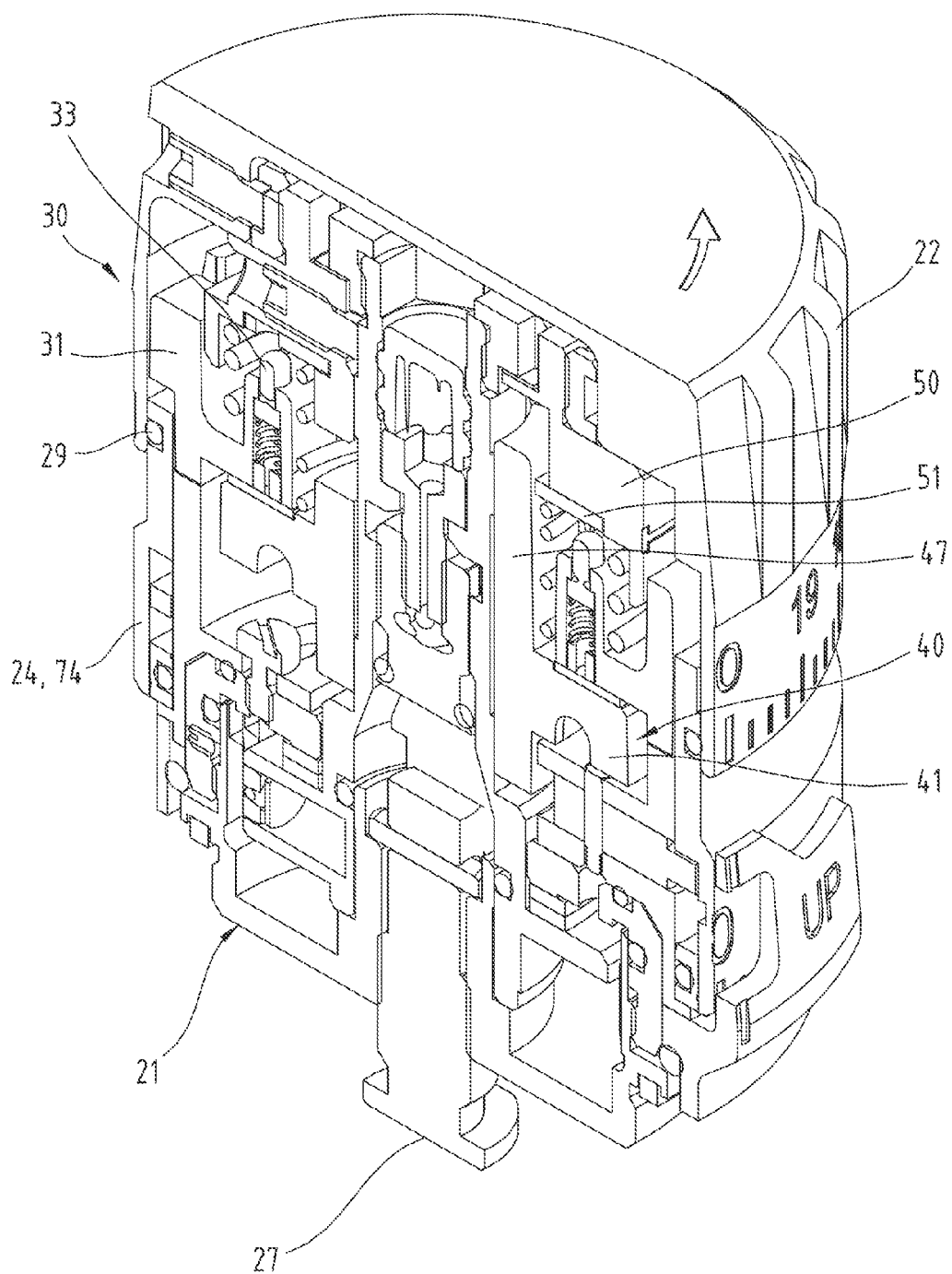
Figure 5:
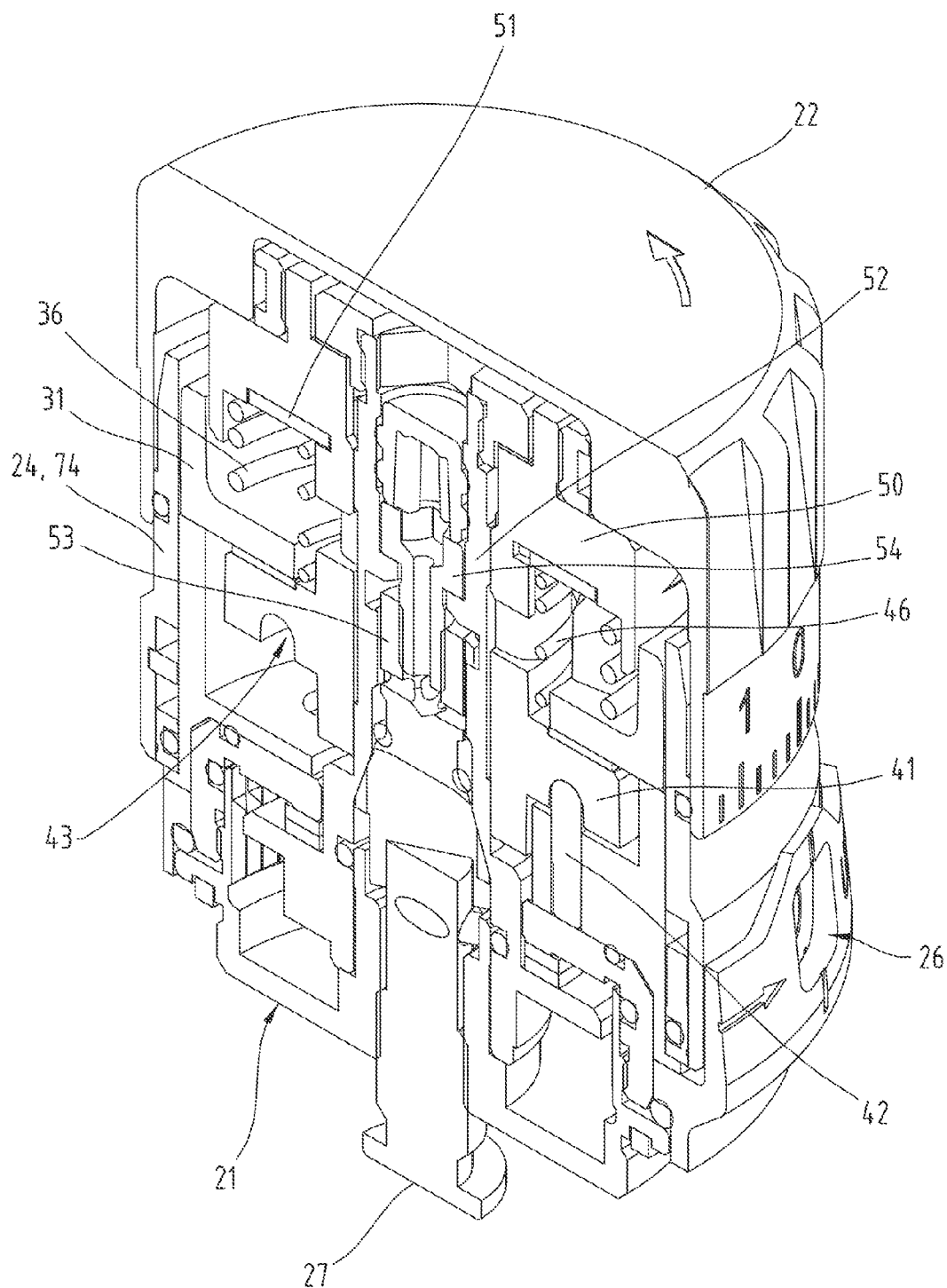
Figure 6:
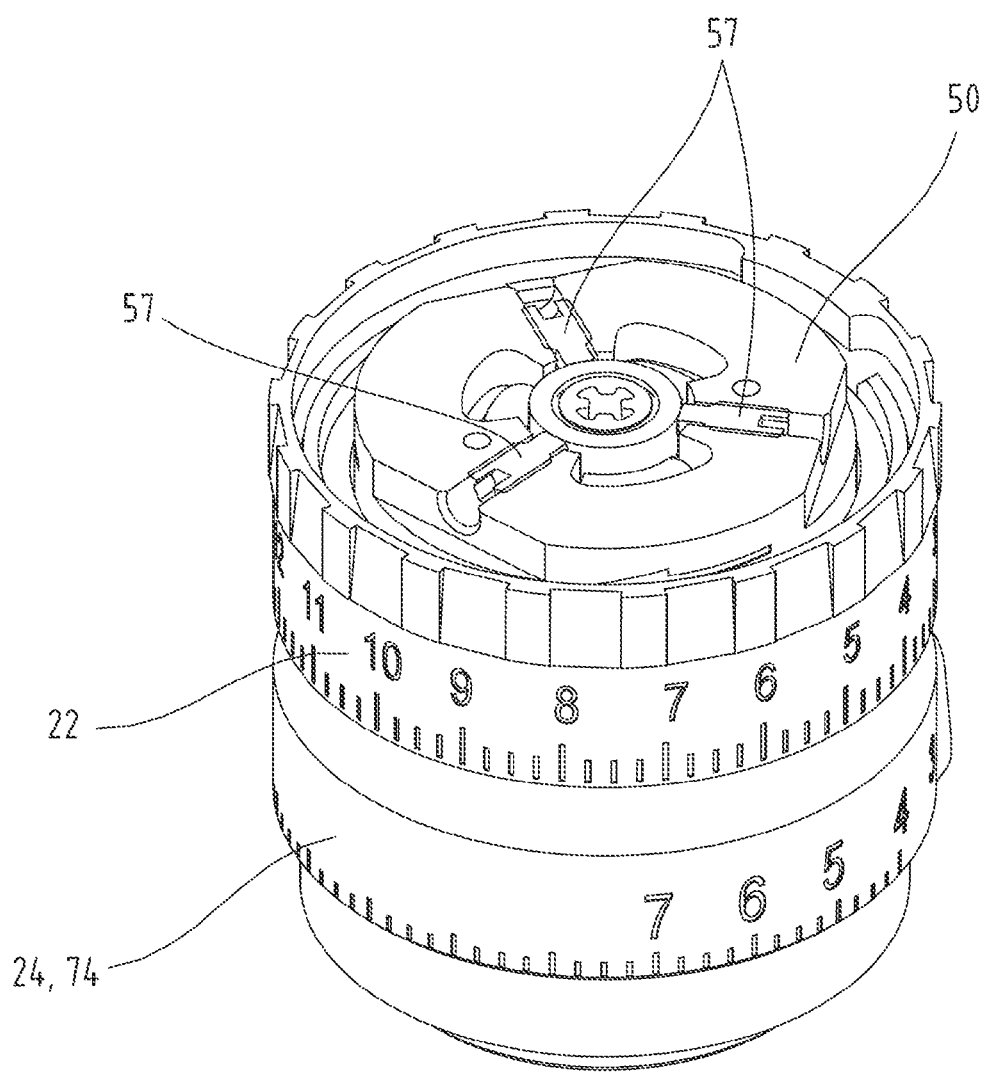
Figure 7:
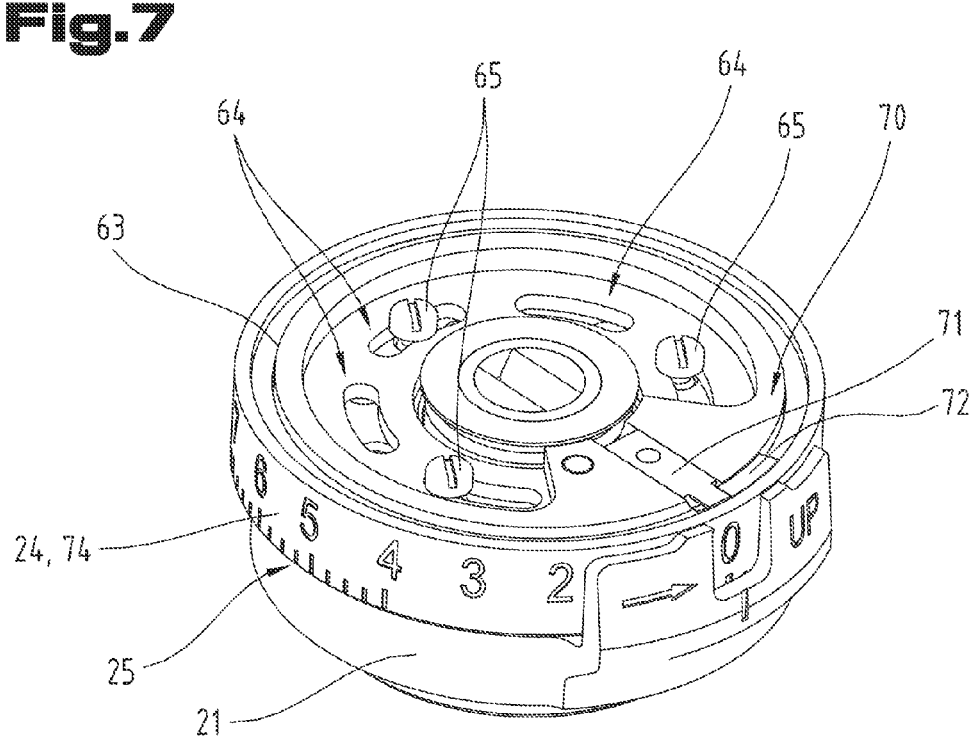
Figure 8:
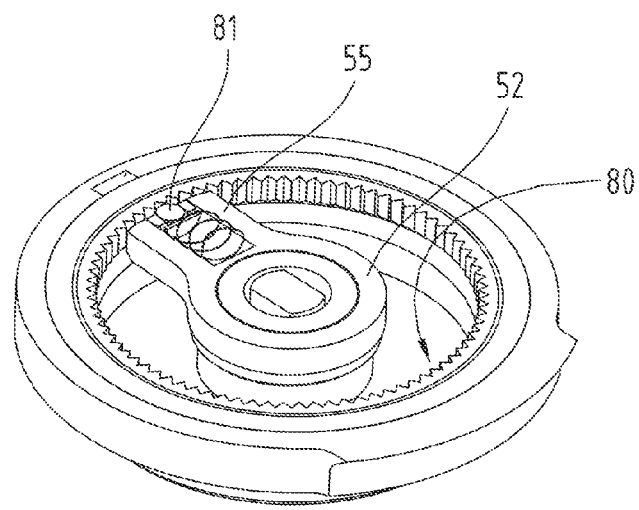
Figure 9:
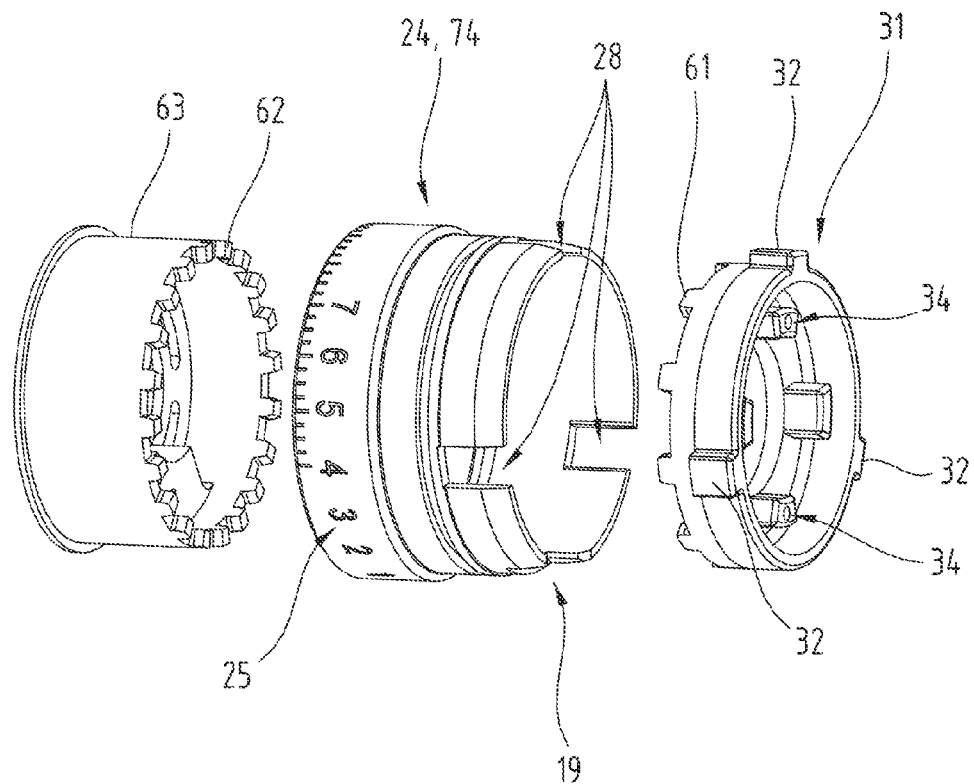
Figure 10:
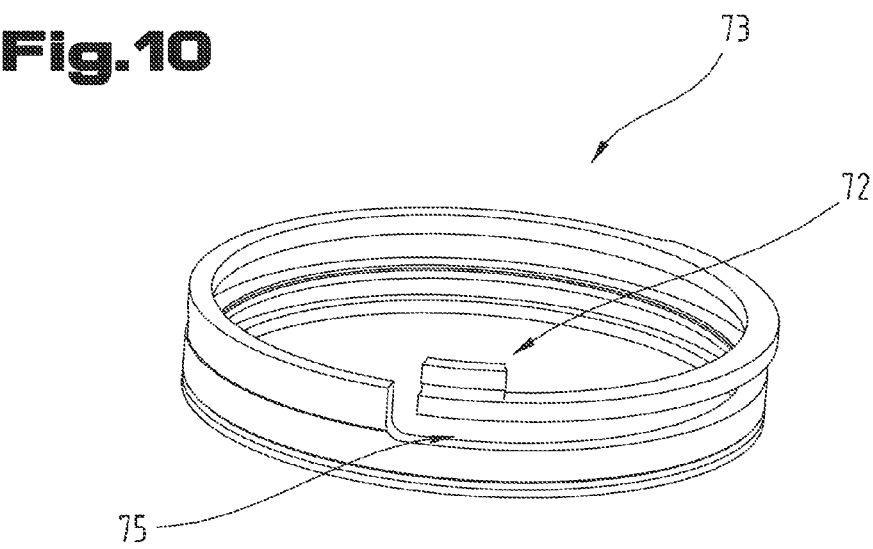
Figure 11:
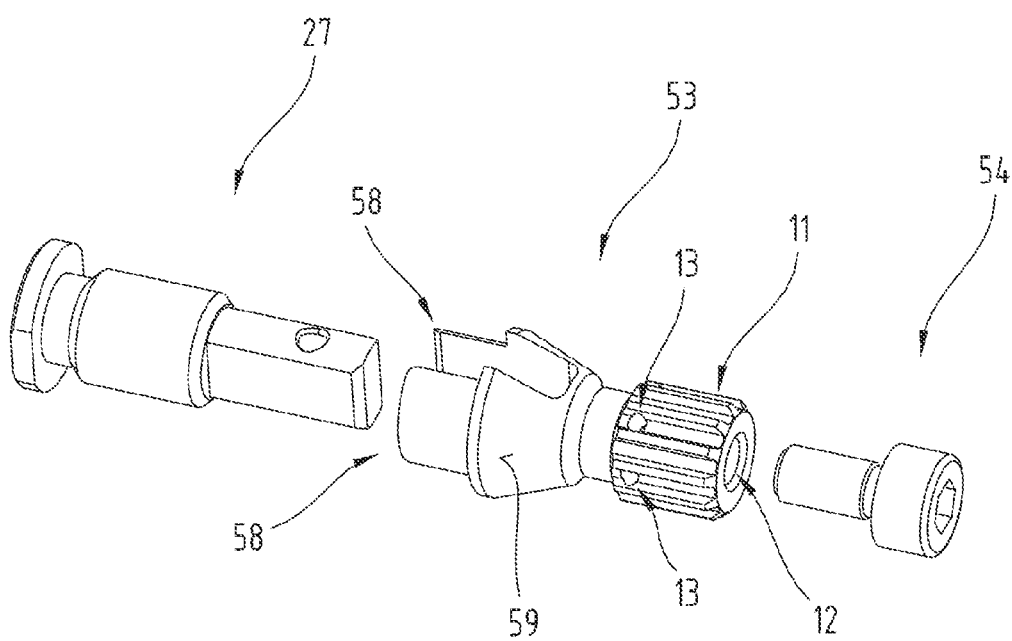
Figure 12:
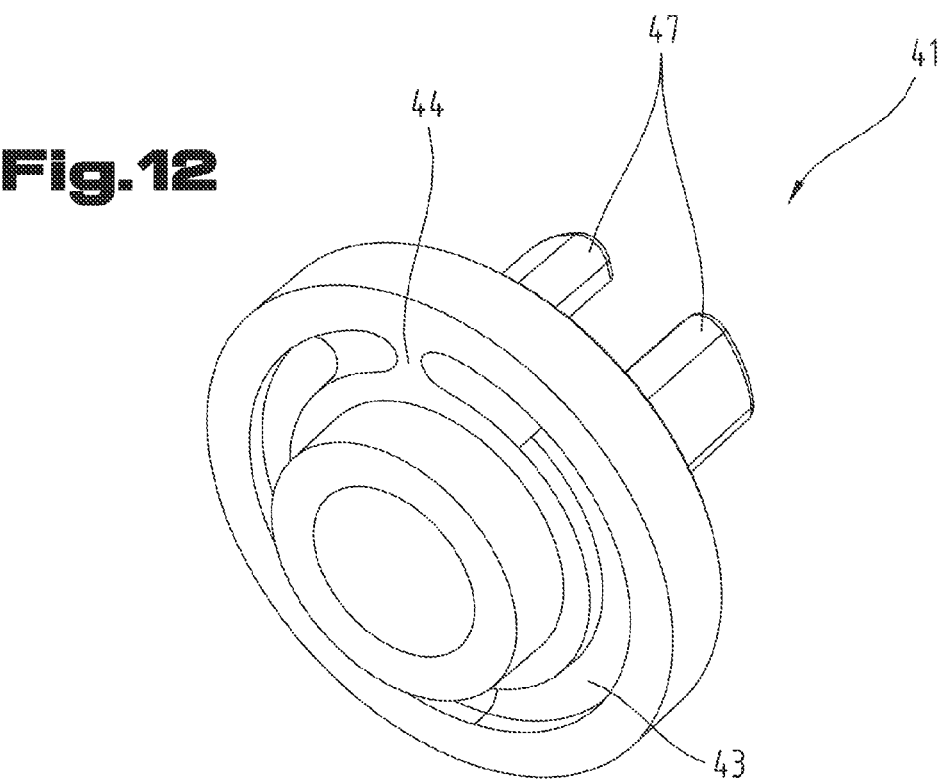
Figure 13:
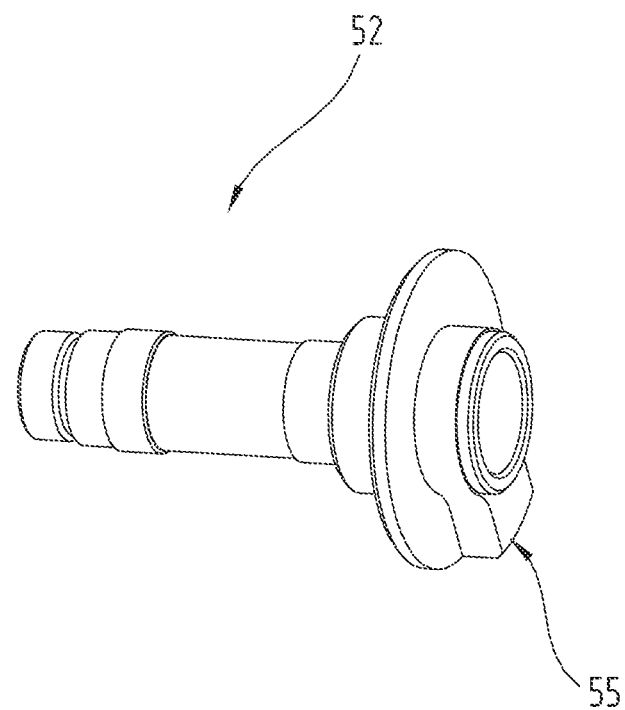
Figure 14:
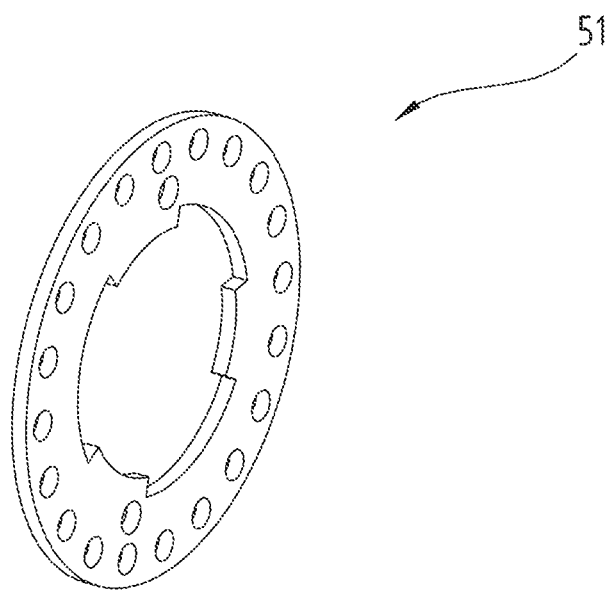

The latter show (partly in a simplified, diagrammatic representation):

FIG. 1 a telescopic sight in cross section parallel to the optical axis;

FIG. 2 an adjustment turret according to the invention;

FIG. 3 the adjustment turret of FIG. 2 in cross section;

FIG. 4 the adjustment turret in cross-sectional representation;

FIG. 5 the adjustment turret in cross-sectional representation;

FIG. 6 the adjustment turret in the region of the drive element in cross-sectional representation;

FIG. 7 the adjustment turret in the region of the display element in cross-sectional representation;

FIG. 8 a catch of the adjustment turret;

FIG. 9 the display element, the locking sleeve and the driver;

FIG. 10 the stop ring;

FIG. 11 the transmission element with the hollow screw;

FIG. 12 the switching element;

FIG. 13 the driver spindle;

FIG. 14 the control disk.

First of all, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position.

The exemplary embodiments show possible embodiment variants of the adjustment turret, whereby it should be noted at this point that the invention is not restricted to the embodiment variants shown in particular, but rather various different combinations of the individual embodiment variants are also possible and this variability, due to the teaching on technical procedure, lies within the ability of a per-son skilled in the art in this technical field.

Furthermore, also individual features or combinations of features from the various exemplary embodiments shown and described can represent in themselves independent or inventive solutions.

The problem addressed by the independent solutions of the invention can be taken from the description.

All of the details relating to value ranges in the present description are defined such that the latter include any and all part ranges, e.g. a range of 1 to 10 means that all part ranges, starting from the lower limit of 1 to the upper limit 10 are included, i.e. the whole part range beginning with a lower limit of 1 or above and ending at an upper limit of 10 or less, e.g. 1 to 1.7, or 3.2 to 8.1 or 5.5 to 10.

Mainly the individual embodiments shown in the figures can form the subject mat-ter of independent solutions according to the invention. The objectives and solutions according to the invention relating thereto can be taken from the detailed descriptions of these figures.

Finally, as a point of formality, it should be noted that for a better understanding of the structure of the adjustment turret, the latter and its components have not been represented true to scale in part and/or have been enlarged and/or reduced in size.

FIG. 1 shows in a very diagrammatic representation a long-range optical device 1 in the form of a telescopic sight with an outer housing 2 (main tube), in which a reversing system 5 is arranged between the lens 3 and eyepiece 4. The optical elements of the reversing system 5, e.g. two cemented lenses, sit in an inner housing 6 (auxiliary tube). The reversing system 5 can be mounted rotatably or tiltably together with the inner housing 6 as a structural unit on the inside of the outer housing 2 on a bearing 7, e.g. ball seat. Said unit is tilted by making an adjustment perpendicular to the optical axis 9 (indicated by a double arrow). In this way the direction of the line of sight 10 also changes which can be adjusted specifically by means of the adjusting mechanism.

To adjust the reversing system 5 inside the outer housing 2 an adjustment turret 20 acting on the reversing system 5 is provided, which can be activated by means of a rotary control element 22 (FIG. 2).

To reset the reversing system 5 along the adjusting path (double arrow) a resetting mechanism 8 is provided which in axial direction is preferably located at the same height as the adjustment turret 20.

In alternative embodiments the adjustment turret 20 can also work together with other optical components within the outer housing 2. Thus e.g. the lens 3 can be mounted adjustably inside the outer housing 2 in order to achieve an adjustment of the line of sight 10. Likewise the adjustment turret 20 could be set up to move a reticule.

FIG. 2 shows a preferred embodiment of an adjustment turret 20 according to the invention from the outside. A base 21 supports a rotary control element 22 in the form of a rotary cap, which is mounted rotatably relative to the base 21 about an axis of rotation 100. In the preferred embodiment of FIG. 2 the rotary control element 22 is provided with markings 23 around its circumference, which form a scale and show the position of the rotary control element 22 within a rotation.

Underneath the rotary control element 22 is an annular or sleeve-like display element 24, which is provided with markings 25 around its circumference. The display element 24 is also rotatable about the axis of rotation 100, however the extent of its rotation is dependent on the rotation of the rotary control element 22. The corresponding coupling mechanism between the rotary control element 22 and display element 24 is described in more detail below.

The display element 24 is used to display the rotation of the rotary control element 22 at a given time. The markings 25 comprise a sequence of markings of the same kind. The latter are spaced apart from one another equidistantly around the circumference and form a scale graduation. In the present case the latter are digits in a numerical sequence. The angular spacing between adjacent markings of the same kind corresponds to the angle of rotation about which the display element 24 can be rotated during a full rotation of the rotary control element 22 about the axis of rotation 100.

The rotary control element 22 and the display element 24 are arranged to be concentric to one another and form respectively a casing section of the adjustment turret 20. According to the preferred embodiment of FIG. 2 the rotary control element 22 and display element 24 have essentially the same diameter.

FIG. 2 also shows a reference marking 26 which is stationary in relation to the base 21 and provides a reference to the markings 25 forming a scale on the display element 24. Here the reference marking 26 is configured as a viewing window through which the current marking of the display element 24 can be viewed. The user can thus see at a glance the current rotational position of the rotary control element 22 and can read or come to a conclusion about the current setting together with the position of the markings 23 on the rotary control element 22.

An actuating element 27 projects from the bottom side of the adjustment turret 20 which protrudes downwards to a greater or lesser extent as a function of the rotational position of the rotary control element 22. This means that by the rotational activation of the rotary control element 22 the actuating element can be moved up and down along the axis of rotation 100 (indicated by the double arrow in FIG. 2) and in the installed state pushes against an optical component of a long-range optical device (FIG. 1). In addition, the adjustment turret 20 comprises a device for converting the rotational movement of the rotary control element 22 into a translational movement of the actuating element 27, wherein—as described in more detail below—said device preferably comprises a threaded spindle.

FIG. 3 shows an adjustment turret 20 according to the invention in cross section. On the inside of the adjustment turret 20 a mechanical coupling mechanism 30 is provided, by means of which the rotary control element 22 works together with the display element 24. Furthermore, the rotary control element 22 acts via a drive element 50 on a transmitting spindle 52, which transmits by means of a transmission element 53 the rotational movement to the actuating element 27 designed as a threaded spindle. The transmission element 53 is thus designed so that it enables an axial adjustment of the actuating element 27.

The rotary control element 22 and the display element 24 overlap at least partly. There is a sealing ring 29 in the overlapping area between the rotary control element 22 and display element 24.

FIG. 6 shows the connection of the rotary control element 22 to the rotary transmission spindle 52 or the drive element 50 from above. The drive element 50 is connected in a rotatably secure manner by means of radially running screws 57 to the rotary transmitting spindle 52. The rotary control element 22 is cupped over the drive element 52 or over the rotary transmitting spindle 52 and coupled in a rotatatably secure manner to the drive element 50 by means of radial screws 56 (FIG. 3).

The coupling mechanism 30 is designed so that the display element 24 can be rotated in at least one rotational position of the rotary control element 22 by the rotary control element 22 about the axis of rotation 100 and so that during a full rotation of the rotary control element 22 about the axis of rotation 100 the display element 24 can be rotated relative to the base 21 by the rotary control element 22 only about an angle of rotation which corresponds to part of a full rotation. The coupling mechanism 30 thus represents a reduction gear. In the shown preferred embodiment the translation is performed intermittently. This means that the coupling mechanism changes during a full rotation of the rotary control element 22 from a coupled position, in which it links the rotary control element 22 and the display element 24 to one another in terms of drive and an uncoupled position in which the rotary control element 22 and the display element 24 are uncoupled from one another.

Preferably, the angle of rotation, about which the display element 24 can be rotated during a full rotation of the rotary control element 22 about the axis of rotation 100, is at most 72°, at most 54°. In the shown embodiment the angle is 18°, whereby twenty rotations of the rotary control element 22 can be shown by the display element.

By means of the rotary control element 22 more than two, preferably at least four, particularly preferably at least nine full rotations can be performed about the axis of rotation 100. In the shown embodiment even twenty rotations are possible.

The coupling mechanism of the shown preferred embodiment is described in more detail in the following.

As already mentioned the coupling mechanism 30 can be moved between a coupling position, in which the display element 24 can be rotated by the rotary control element 22, and an uncoupled position in which the display element is uncoupled from the rotational movement of the rotary control element. This means that the display element 24 is driven relative to the base in a limited rotational section by the rotary control element 22. Outside this rotational section the display element 24 rests relative to the base 21 and only the rotary control element 22 rotates.

The coupling mechanism 30 comprises a driver 31 which can be displaced axially along the transmission spindle 52 in relation to the axis of rotation 100 between a first position and a second position. In the first position, which corresponds to the uncoupled position of the coupling mechanism 30, the driver 30 is uncoupled from the rotary control element 22 (FIG. 3). In the second position, which corresponds to the coupled position of the coupling mechanism 30, the driver 31 is coupled to the rotary control element 22 and can be rotated by the rotary control element 22 about the axis of rotation 100, so that a rotational movement of the rotary control element 22 can be transmitted via the driver 31 to the display element 24. The driver 31 is preferably designed to be annular and arranged concentrically to the rotary control element 22.

The connection of the driver 31 to the display ring 24 is preferably formed by at least one driver structure 32 projecting in radial direction, which projects into at least one recess 28 of the display element 24 formed around the circumference of the display element 24. In the preferred embodiment a plurality of recesses 28 with assigned driver structures 32 are provided, as shown in FIG. 9. The recesses 28 are thus designed to be so long in axial direction that the driver 31 can be displaced axially relative to the display element 24 without releasing the connection of the driver 31 to the display ring 24, which is secured rotationally to a greater or lesser extent.

As shown in FIG. 3 the driver 31 can comprise at least one driver pin 33 which in the coupled position engages with a drive element 50 connected to the rotary control element 22. In the shown embodiment the drive element comprises a control disk 51, which is provided with holes at particular angular spacings (FIG. 14).

When the driver 31 is pushed upwards the driver pins 33 engage in the holes of the control disk 51, whereby a connection is formed with the rotary control element 22. By means of this connection a rotational movement of the rotary control element 22 can be transmitted to the display element 24.

The driver 31 can comprise a spring 35 for each driver pin 33, which loads the driver pin 33 in the coupled position in the direction of the drive element 50. In this way the driver pins are pushed respectively in the direction of a hole of the control disk 51, whereby a reliable connection is formed.

The driver pins 33 can also be guided respectively in a guide 34 which runs essentially parallel to the axis of rotation 100.

In the following a description is given of how the driver enters into the coupled position or the uncoupled position. In the preferred embodiment the coupling mechanism 30 comprises a switching mechanism 40, which in one rotational position of the rotary control element 22 moves the driver 31 from the first position into the (axially displaced) second position. For this the switching mechanism 40 comprises a switching element 41, which is mounted to be axially displaceable in relation to the axis of rotation 100 and can be rotated by the rotary control element 22 about the axis of rotation 100, and an actuating element 42, which is stationary in relation to the base 21. The actuating element 42 is preferably designed in the form of an actuating bolt or actuating pin projecting upwards parallel to the axis of rotation 100 (FIG. 5). An optional sliding disk 45 between the driver 31 and switching element 41 can ensure that the driver 31 can be rotated more easily relative to the switching element 41.

In a rotational position of the rotary control element 22 the actuating element 42 pushes the switching element 41 axially in the direction of the driver 31. In the present embodiment this is achieved in that the switching element 41 has a peripheral groove on its bottom end side 43, which is interrupted at one point by a web 44 (FIG. 12).

In the uncoupled position the actuating element 42 runs in the groove 43. In a specific rotational position the web begins to run onto the actuating element 42, whereby the switching element 41 is displaced axially upwards. In the coupled position the actuating element 42 bears on the web 44 and thus lifts the switching element 41 in axial direction, whereby the driver 31 is also pushed against the drive element 50 or the control disk 51.

In order to be (or remain) rotatably connected to the rotary control element 22 the switching element 41 comprises axial extensions 47, which project into corresponding recesses of the drive element 50 or the control disk 51. A mutual rotation of the switching element 41 and rotary control element 22 is prevented in this way. An axial displacement of the switching element 41 relative to the rotary control element 22 or switching element 41 remains possible however.

The coupling mechanism 30 comprises a spring 36, which loads the driver 31 in the direction of the first position (uncoupled position). The latter is configured as a spiral spring and arranged concentrically relative to the driver 31. The coupling mechanism 30 also comprises a spring 46, which loads the switching element 41 in the direction of the uncoupled position. The latter is also configured as a spiral spring and arranged concentrically to the switching element 41. Both springs 36, 46 are in the form of compression springs. The spring 36 acting on the driver 31 is preferably arranged inside the spring 46 acting on the switching element.

The coupling mechanism 30 comprises in the preferred embodiment a locking device 60, which in the uncoupled position locks the display element 24 to the base 21 in a non-rotatable manner.

A first part of the locking device 60 is thus formed by the driver 31 and a second part of the locking device 60, which works together with the first part of the locking device 60, is designed to be stationary in relation to the base 21.

As shown in FIG. 9 the first part of the locking device 60 comprises first locking elements 61 distributed around the circumference of the driver 31. The second part of the locking device 60 comprises second locking elements 62 designed to be stationary in relation to the base. The latter are formed on a locking sleeve 63 which is stationary to the base 21 and is arranged for example inside the display element 24 or is surrounded by the display element 24.

FIG. 8 shows a circumferential catch 80 in detail which is provided in the lower section of the adjustment turret 20. The latter lines the inner wall of an annular recess. The rotary transmission spindle 52 comprises a radial extension 55 in the region of its bottom end, in which a spring is mounted in a radial guide which pushes a ball 81—a bolt would also be possible—axially outwards against the catch 80. Said mechanism enables the user to detect by touch the extent of the rotational movement of the rotary control element 22 caused thereby. Of course, such a mechanism is only optional.

In the following, the aspect of a stop mechanism is described in more detail with reference to FIGS. 3, 7 and 10. In the following the part of the adjustment turret 20 referred to so far as a display element 24 is referred to as an actuating element 74. This procedure should take account of the fact that the actuating element 74 (in connection with the stop mechanism described in the following) need not necessarily also be a display element. However, in the preferred embodiment the actuating element is also a display element.

FIG. 3 shows an adjustment turret 20 for a long-range optical device 1, in particular a telescopic sight, with a base 21 and a rotary control element 22, which can be rotated relative to the base 21 about an axis of rotation 100. In this case a first stop 71 can be seen which projects radially outwards and is part of a stop pair 70. FIG. 7 shows the whole stop pair 70 which is formed by a first stop 71 and a second stop 72. The stops 71, 72 are shown in the stop position in FIG. 7, in which they limit the rotational movement of the rotary control element 22.

The adjustment turret 20 also comprises a mechanism for overcoming the stop position of the stop pair 70. This mechanism comprises an actuating element 74 that is accessible from the outside, which supports one of the stops (here the second stop 72). Alternatively it would be possible for the actuating element 74 to co-operate with one of the stops 71, 72 in a different manner.

In at least one rotational position of the rotary control element 22 the actuating element 74 can be moved relative to the base 21 and relative to the rotary control element 22, so that by activating the actuating elements 74 one stop 71 can be moved relative to the other stop 72, whereby the stop position is overcome.

In the present exemplary embodiment the actuating element 74 is axially displaceable in the at least one rotational position of the rotary control element 22 relative to the axis of rotation 100. In this case the actuating element 74 is axially displaceable relative to the base 21 and also relative to the rotary control element 22.

The first stop 71 is configured to be stationary in relation to the base 21 and as a projection, in particular a pin or bolt, projecting radially outwards in relation to the axis of rotation 100.

In the preferred embodiment the mechanism for overcoming the stop position comprises a stop ring 73 (FIG. 10), which forms the second stop 72 and a circumferential guide 75, in which the first stop 71 is guided before reaching or after overcoming the stop position (depending on the direction from which the stops 71, 72 approach the stop position). After reaching the stop position the actuating element 74 has to be displaced axially to override the stop position. In this way the stops 71, 72 (in axial direction) are displaced against one another, whereby a further rotation of the rotary control element 22 is possible beyond the stop position.

The actuating element 74 is configured to be sleeve-like and the stop ring 73 (FIG. 10) is inserted into the actuating element 74 and secured, in particular adhered (FIG. 3). Alternatively, the second stop 72 and the guide 75 could also be designed in one piece with the actuating element 74.

As shown in FIG. 7 the first stop 71 is connected detachably to the base 21 and can be secured around the circumference in different positions relative to the base 21. In the present example this is ensured in that the first stop sits in a sleeve (the locking sleeve 63), which on its bottom side comprises elongated holes 64 distributed around the axis of rotation 100. Screws 65 fix the sleeve 63 in a specific position. By loosening the screws 65, rotating the sleeve 63 and then fixing the sleeve 63 in the new position the first stop 71 can be adjusted as desired. In this way the stop position can be adjusted such that in the stop position the line of sight is adjusted according to the zeroing distance. This procedure requires releasing and removing the top part of the adjustment turret 20. As shown in FIG. 6 this can be performed by removing the rotary control element 22 designed as a rotary cap and releasing the (grub) screws 57.

The following explains again briefly how the rotary control element 22 works together with the second stop 72 and rotates the latter therewith. In addition the actuating element 74 can be rotated about the axis of rotation 100. The adjustment turret 20 comprises a mechanical coupling mechanism 30, by means of which the rotary control element 22 works together with the actuating element 74, wherein the coupling mechanism 30 is configured so that the actuating element 74 can be rotated in at least one rotational position of the rotary control element 22 by the rotary control element 22 about the axis of rotation 100.

The rotary control element 22 and the actuating element 74 are preferably arranged above one another in the direction of the axis of rotation 100.

The coupling mechanism 30 is preferably designed such that during a full rotation of the rotary control element 22 about the axis of rotation 100 the actuating element 74 can be rotated relative to the base 21 by the rotary control element 22 only about an angle of rotation which corresponds to part of a full rotation.

In the shown embodiment the actuating element 74 is identical to the already previously described display element 24 and is thus rotatable about the axis of rotation 100. It has at least one marking 25 around its circumference that is visible from the outside.

There is no need to describe the coupling mechanism between the rotary control element 22 and actuating element 24 in more detail, as the latter can be designed in the same way as the rotary control element 22 and the display element 24. All of the variants of the coupling mechanism described above can be applied equally to the coupling between the rotary control elements 22 and actuating element 74. According to a preferred aspect of the invention the actuating element 74 can only be moved or activated in the rotational position of the rotary control element 22, which corresponds to the stop position of the stop pair 70. In the present case this is achieved in that the sleeve-like actuating element 74 in the region of its upper edge has a recess 19, which moves into a (not shown) projection of the upper part of the adjustment turret 20, when the actuating element 74 is axially displaced. In every other rotational position the projection prevents the axial displacement of the actuating element 74.

It is not necessary for the actuating element to be designed to be sleeve-like or ring-like. Rather embodiments are also possible in which the actuating element is designed not to be symmetrical to the axis of rotation 100. It could e.g. be a pin or bolt accessible from the outside. Also switch or button-like actuating elements are possible. Thus simple solutions are also considered as forming the part of the invention, in which e.g. the actuating element does not rotate the rotary control element, but essentially retains its position relative to the base.

In the following the aspect of the transmission of the rotational movement of the rotary control element 22 into a translational adjusting movement of the actuating element 27 is described in more detail with reference to FIGS. 3 and 11. The rotary transmission spindle 52 is connected in a rotationally secure manner to the rotary control element 22. The actuating element 27 in the shown exemplary embodiment is a threaded spindle, which is mounted rotatably in an internal thread of the base 21. According to the pitch of the thread the rotational movement also brings about a translational movement of the actuating element 27.

According to a preferred embodiment a transmission element 53 is connected between the rotary transmission spindle 52 and the actuating element 27. On the side facing the actuating element 27 the transmission element 53 comprises two arms 58. The faces of the arms 58 directed towards one another are essentially parallel to one another and enable an axial movement of the actuating element 27 mounted between the arms. In addition, the arms 58 transmit the rotational movement to the actuating element 27 (or an element mounted in front of the actuating element 27) in the form of a threaded spindle.

The transmission element 53 is connected in a rotationally secure manner to the rotary transmission spindle 52. On its side facing away from the arms 58 the transmission element 53 has a toothing 11 on its outside, which sits in a corresponding inner tooting of the rotary transmission spindle 52. On the inside the transmission element 53 comprises an internal thread. The transmission element is connected to the rotary transmission spindle 52 by means of a screw 54 (FIG. 11).

In the region of the arms 58 the transmission element 53 on its outside has a conically formed section 59 (FIG. 11), wherein the conical form widens in the direction of the ends of the arms 58. The rotary transmission spindle 52 has a correspondingly conically formed inner surface (counter face 14). By screwing the transmission element 53 inside the rotary transmission spindle 52 with the screw 54 the conically formed section 59 of the transmission element 53 is pushed against the conically formed counter face 14 of the rotary transmission spindle 52. In this way the arms 58 are pushed towards one another and wedge the upper part of the actuating element 27 between them. In order to achieve a sufficient wedging force here the conical shape of the transmission element 53 in the not yet installed state is slightly flatter than the conical form of the counter face 14.

The transmission element 53 thus provides tolerance equalization and prevents unwanted play and lost motion, whereby the precision of the adjustment is also improved.

LIST OF REFERENCE NUMERALS 1 long-range optical device
2 outer housing
3 lens
4 eyepiece
5 reversing system
6 inner housing
7 bearing
8 resetting mechanism
9 optical axis
10 line of sight
11 toothing
12 hole
13 opening
14 counter face
19 recess
20 adjustment turret
21 base
22 rotary control element
23 marking
24 display element
25 marking
26 reference marking
27 actuating element
28 recess of the display element 24
29 sealing ring
30 coupling mechanism
31 driver
32 driver structure
33 driver pin
34 guide
35 spring for driver pin 33
36 spring for driver 31
40 switching mechanism
41 switching element
42 control element
43 groove
44 web
45 sliding disk 46 spring for switching element 41
47 axial extension of the switching element 41
50 drive element
51 perforated disk
52 rotary transmission spindle
53 transmission element
54 cannulated screw
55 radial guide
56 screws
57 screws
58 arm
59 conically formed section
60 locking device
61 first locking elements
62 second locking elements
63 locking sleeve
64 elongated hole
65 screw
70 stop pair
71 first stop
72 second stop
73 stop ring
74 actuating element
75 guide
80 catch
81 ball
82 spring for ball 81
100 axis of rotation

The invention claimed is:

1. An adjustment turret for a long-range optical device comprising:
a base;
a rotary control element, rotatable relative to the base about an axis of rotation;
a display element rotatable about the axis of rotation having at least one marking around its circumference; and
a mechanical coupling mechanism, coupling the rotary control element together with the display element, the mechanical coupling mechanism being configured such that the display element can be rotated about the axis of rotation by the rotary control element in at least one rotational position of the rotary control element;
wherein, the mechanical coupling mechanism is configured such that during a full rotation of the rotary control element about the axis of rotation the display element can be rotated by the rotary control element relative to the base only about an angle of rotation which corresponds to part of said full rotation.

2. The adjustment turret as claimed in claim 1, wherein the mechanical coupling mechanism is configured such that the angle of rotation, about which the display element can be rotated relative to the base about the axis of rotation during the full rotation of the rotary control element, is at most 72°.

3. The adjustment turret as claimed in claim 1, wherein the rotary control element can perform more than two full rotations about the axis of rotation.

4. The adjustment turret as claimed in claim 1, wherein the display element is provided with a scale which comprises a plurality of markings of the same kind as said at least one marking spaced apart an angular spacing from one another around the circumference of the display element, wherein the angular spacing between adjacent markings of said plurality of markings corresponds to said angle of rotation about which the display element can be rotated relative to the base about the axis of rotation during the full rotation of the rotary control element.

5. The adjustment turret as claimed in claim 4, wherein a section of the display element provided with said scale forms a casing section of the adjustment turret.

6. The adjustment turret as claimed in claim 4, wherein said plurality of markings form a numerical sequence.

7. The adjustment turret as claimed in claim 1, wherein the rotary control element and the display element are arranged above one another in relation to a direction parallel to said axis of rotation, the rotary control element being arranged above the display element.

8. The adjustment turret as claimed claim 1, wherein the rotary control element and the display element overlap at least partly to an extent of an overlapping area parallel to said axis of rotation, wherein a sealing ring is mounted in said overlapping area between the rotary control element and display element.

9. The adjustment turret as claimed in claim 1, wherein the mechanical coupling mechanism is configured such that a transfer of rotational movement from the rotary control element to the display element is performed intermittently only after a complete rotation of the rotary control element.

10. The adjustment turret as claimed in claim 1, wherein the mechanical coupling mechanism can be moved between a coupled position, in which the display element can be rotated by the rotary control element, and an uncoupled position in which the display element is uncoupled from rotational movement of the rotary control element.

11. The adjustment turret as claimed in claim 10, wherein the mechanical coupling mechanism comprises a driver, which can be displaced axially in relation to the axis of rotation between a first position and a second position, wherein the driver in the first position, which corresponds to the uncoupled position of the mechanical coupling mechanism, is uncoupled from the rotary control element and in the second position, which corresponds to the coupled position of the mechanical coupling mechanism, is coupled with the rotary control element and can be rotated by the rotary control element about the axis of rotation, so that a rotational movement of the rotary control element can be transmitted via the driver to the display element.

12. The adjustment turret as claimed in claim 11, wherein the driver comprises at least one driver structure protruding in a radial direction, which projects into at least one recess of the display element formed around the circumference of the display element.

13. The adjustment turret as claimed in claim 11, wherein the driver comprises at least one driver pin, which engages with a drive element connected to the rotary control element when the driver is in the second position.

14. The adjustment turret as claimed in claim 13, wherein the driver 1 comprises a spring, which loads said at least one driver pin in the coupled position in the direction of the drive element.

15. The adjustment turret as claimed in claim 11, wherein the mechanical coupling mechanism comprises a switching mechanism, which in a rotational position of the rotary control element moves the driver from the first position into the second position.

16. The adjustment turret as claimed in claim 15, wherein the switching mechanism comprises a switching element, which is mounted to be axially displaceable in relation to the axis of rotation and can be rotated by the rotary control element about the axis of rotation, and a control element which is stationary relative to the base and in a rotational position of the rotary control element pushes the switching element axially in the direction of the driver.

17. The adjustment turret as claimed in claim 16, wherein the switching element on one of its end faces has a circumferential groove which is interrupted at one point by a web, wherein the control element is guided in the uncoupled position in the groove and in the coupled position bears against the web and thus displaces the switching element in axial direction.

18. The adjustment turret as claimed in claim 11, wherein the mechanical coupling mechanism comprises a spring, which loads the driver in the direction of the first position, and/or the mechanical coupling mechanism comprises a spring which loads the switching element in the direction of the uncoupled position.

19. The adjustment turret as claimed in claim 11, wherein the driver is configured to be annular and is arranged to be concentric to the rotary control element.

20. The adjustment turret as claimed in claim 10, wherein the mechanical coupling mechanism comprises a locking device, which in the uncoupled position locks the display element to the base in a rotationally secure manner.

21. The adjustment turret as claimed in claim 20, wherein a first part of the locking device is formed by the driver and a second part of the locking device, which works together with the first part of the locking device, is designed to be stationary in relation to the base.

22. The adjustment turret as claimed in claim 1, wherein the adjustment turret comprises a device for converting rotational movement of the rotary control element into a translational movement of an actuating element, wherein the device comprises a threaded spindle.

23. The adjustment turret as claimed in claim 1, wherein the adjustment turret comprises a reference marking which is stationary in relation to the base and provides a reference to said at least one marking on the display element, wherein the reference marking is a viewing window through which the at least one marking of the display element can be viewed.

24. The adjustment turret as claimed in claim 1, wherein the adjustment turret further comprises:

a stop pair consisting of a first stop and a second stop, which in a stop position limit the rotational movement of the rotary control element; and a mechanism for overcoming the stop position of the stop pair, wherein said mechanism comprises the display element accessible from the outside which bears or cooperates with one of the stops and in at least one rotational position of the rotary control element can be moved relative to the base and relative to the rotary control element so that by activating the display element one stop can be displaced relative to the other stop and the stop position can be overcome.

25. The adjustment turret as claimed in claim 24, wherein said mechanism in at least one rotational position of the rotary control element can be moved relative to the base and relative to the rotary control element in axial direction with respect to the axis of rotation.

26. The adjustment turret as claimed in claim 1, wherein the adjustment turret further comprises:

a device for converting rotational movement of the rotary control element into a translational movement of an actuating element, wherein the device comprises a rotary transmitting spindle connected to the rotary control element and a transmission element connected in a rotationally secure manner to the rotary transmitting spindle and having at least two arms on a side facing the actuating element and having an obliquely or conically formed section on an outside in the region of said arms, wherein the obliquely or conically formed section of the transmission element in the installed state is pushed against a counter face of the rotary transmitting spindle, so that owing to the force acting on the obliquely or conically formed section the arms are pushed towards one another and the actuating element or an element arranged in front of the actuating element wedges itself in between.

\* \* \* \* \*